United States Patent Office 2,907,696
Patented Oct. 6, 1959

2,907,696

STABLE VITAMIN A FOR AQUEOUS DISPERSIONS

William E. Stieg and Joseph A. Kardys, Groton, Conn., assignors to Chas. Pfizer & Co., Inc., New York, N.Y., a corporation of Delaware No Drawing. Application January 3, 1956
Serial No. 556,784

2 Claims. (Cl. 167—81)

This invention is concerned with a process for the preparation of materials particularly suitable for the formation of aqueous dispersions containing vitamin A in which the vitamin A activity remains essentially constant over an extended period of time. It is also concerned with the products formed by such a process.

The terminal hydroxyl group in vitamin A is readily esterified with such acids as acetic, propionic, butyric, palmitic, stearic, myristic, etc. These esters, particularly those from the higher aliphatic acids such as palmitic, myristic, etc., are useful for the preparation of aqueous dispersions which are readily administered to individuals requiring vitamin A supplementation of their diet, particularly to children or aged people in ill health. These aqueous dispersions are prepared by utilization of a suitable form of vitamin A such as the esters mentioned above and a dispersing agent which maintains a uniform distribution of vitamin A throughout the aqueous systems. Although dispersions are made containing only vitamin A they will most often contain other vitamins such as D, B, C, etc. One distinct disadvantage of such aqeous dispersions is the loss in activity of the vitamin A which is encountered upon storage particularly when the vitamin A used for the preparation of such dispersions is synthetic all-trans vitamin $A_1$ or purified all-trans vitamin $A_1$ which has been obtained from various natural sources.

The loss in activity which occurs upon storage of the aqueous dispersions necessitates in practice the addition of extra material, that is, an excess over that which is stated on the label as the content of the vitamin A. This is done in order that the product when utilized by the patient, or when dispensed by the druggist after storage for an appreciable length of time, shall contain the labeled proportion of vitamin A activity.

The present invention avoids the difficulties that have been encountered in the past with vitamin A preparations for aqueous dispersions. The process of the present invention consists of mixing vitamin A in the form of an ester, that is, the all-trans form of vitamin $A_1$ with approximately one-half part by weight neovitamin $A_1$, that is; 2,3,4-tri-trans-5-cis-vitamin $A_1$ in a form of a suitable ester, preferably one of the longer chain aliphatic esters (which may be the same or a different ester from that of the all-trans vitamin $A_1$). The neovitamin $A_1$ can be obtained from fish liver oils. A particularly useful process is that described by Robinson and Baxter in the Journal of The American Chemical Society, volume 69, page 136.

In the commercial preparation of synthetic crystalline all-trans vitamin $A_1$ in the form of its acetate ester, a material known as hydroxenin acetate is rearranged using acid conditions in an organic solvent. Removal of the organic solvent in vacuo leaves a syrupy mixture from which the all-trans vitamin $A_1$ acetate precipitates in the form of crystals. The mixture which is left behind is known as the mother liquor and contains in addition to all-trans vitamin $A_1$ acetate, a large amount of neovitamin $A_1$ acetate together with small amounts of other vitamin A like materials. This mother liquor serves as a convenient source for the neovitamin $A_1$ of this invention.

The mother liquor described above contains neovitamin $A_1$ in the form of an acetate. Since it is usually more convenient to dispense vitamin A in the form of the esters of the higher aliphatic alcohols, the acetate is usually converted to such an ester—for example, the palmitate. This conversion can be carried out by a number of methods. A very convenient method is the trans-esterification process described in U.S. Patent No. 2,693,435 in which the mother liquor is heated in basic solution using a catalyst with an ester of a lower aliphatic alcohol and a higher aliphatic acid—for example, methyl palmitate until the trans-esterification is complete. The higher ester of neovitamin $A_1$ is isolated by extraction with an organic solvent and obtained by removal of the solvent in vacuo.

The mixtures of this invention can be obtained by combining the trans-esterified mother liquor with an ester of all-trans vitamin $A_1$ or they can be obtained by mixing the original mother liquor with all-trans vitamin $A_1$ in the form of an ester and trans-esterifying the mixture, and can also be obtained by adding to a mixture containing all-trans vitamin $A_1$ and mother liquor sufficient pure crystalline neovitamin $A_1$ to make a product which contains approximately one part by weight of the all-trans form of vitamin $A_1$ and approximately one-half part by weight neovitamin $A_1$.

The lower ester of this process may be an ester other than the acetate such as the propionate or butyrate and the higher ester an ester other than the palmitate such as stearate or oleate. The products of this invention can also be utilized in the form of the lower ester without the necessity of conversion.

When the mixture formed by any of the methods indicated above is dispersed in aqueous solution, storage under ordinary "shelf conditions" results in little or no change in the activity of the vitamin as determined by the standard U.S.P. spectrophotometric assay method. Furthermore, the biological assay value of these dispersions does not change to an appreciable extent upon storage for extended periods of time. This represents a distinct advantage over aqueous dispersions which have been previously described and utilized.

The following examples are given by way of illustration only and are not to be considered as the sole embodiments of this invention many variations of which are possible without departing from the scope of the invention. It is to be understood that the protection hereof is only to be limited by the specific wording of the appended claims.

*Example I*

One hundred grams of pure synthetic crystalline all-trans vitamin $A_1$ palmitate was mixed carefully with 50 grams of neovitamin $A_1$ palmitate. The mixture was thoroughly stirred under an inert gaseous atmosphere. The mixture was then utilized for the preparation of a multivitamin aqueous dispersion containing the following proportions of materials in each 0.6 cc. of dispersion.

| | |
|---|---|
| Vitamin A | 5000 units |
| Vitamin D | 1000 units |
| Vitamin $B_1$ | 2 mg. |
| Vitamin $B_2$ | 0.5 mg. |
| Vitamin $B_6$ | 1.0 mg. |
| Vitamin C | 60 mg. |
| Calcium pantothenate | 3.0 mg. |
| Niacinamide | 20 mg. |
| Glycerin | 40% (v./v.) |
| Tween 80 | 10% (v./v.) |
| Sodium Benzoate | 0.2% (v./v.) |

It was found that the loss in potency over a period of seven weeks at 37° C. of the vitamin A in this preparation averaged about 5%, whereas, when the same type of preparation was made with synthetic crystalline all-trans vitamin $A_1$ palmitate the average loss in potency over the same period and at the same temperature was about 13%.

*Example II*

A mixture of 136 g. of mother liquor obtained during the preparation of synthetic crystalline vitamin $A_1$ acetate and subsequent removal of synthetic crystalline vitamin $A_1$ which contains a large proportion of neovitamin $A_1$ acetate, 136 g. of pure crystalline all-trans vitamin $A_1$ acetate and 220 g. of methyl palmitate is stirred at 55° C. while 18 cc. of 25% methanolic sodium hydroxide is added over a period of five minutes. Stirring is continued at high vacuum until the reaction is complete as indicated by the amount of methyl acetate collected (about 2 hrs.). The reaction is quenched at room temperature with methanol containing the calculated amount of acetic acid to neutralize the trans-esterification catalyst. When the layers have separated the methanol is removed. The residue containing the vitamin A is extracted several more times with methanol to obtain a product of high purity. The last traces of methanol are removed under high vacuum. The yield of stabilized vitamin A palmitate containing approximately one-half part by weight neovitamin $A_1$ and one part by weight all-trans vitamin $A_1$ is 410 gr.

This product was used to prepare a multivitamin aqueous dispersion as described in Example I and again it was found that the loss of potency over a period of seven weeks averaged only about 5% compared to the 13% loss for the same dispersions containing pure crystalline all-trans vitamin $A_1$ palmitate.

What is claimed is:

1. A process for the preparation of stable aqueous suspensions of vitamin A which comprises mixing an aliphatic ester of synthetic vitamin $A_1$ with an aliphatic ester of neovitamin $A_1$ and suspending the resulting mixture in an aqeuous medium.

2. A process for the preparation of stable multivitamin aqueous suspensions containing vitamin A which comprises mixing an aliphatic ester of synthetic vitamin $A_1$ with an aliphatic ester of neovitamin $A_1$ and suspending the mixture in an aqueous medium which contains other vitamins.

References Cited in the file of this patent

UNITED STATES PATENTS

| | | |
|---|---|---|
| 2,552,908 | Robeson | May 15, 1951 |
| 2,693,435 | Stieg | Nov. 2, 1954 |